(12) United States Patent
Vining et al.

(10) Patent No.: US 11,843,484 B2
(45) Date of Patent: Dec. 12, 2023

(54) ADAPTIVE EQUALIZER FOR REDRIVER

(71) Applicant: TEXAS INSTRUMENTS INCORPORATED, Dallas, TX (US)

(72) Inventors: Suzanne Mary Vining, Plano, TX (US); Amit S. Rane, Santa Clara, CA (US); Charles Michael Campbell, Wylie, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/046,716

(22) Filed: Oct. 14, 2022

(65) Prior Publication Data

US 2023/0061303 A1 Mar. 2, 2023

Related U.S. Application Data

(63) Continuation of application No. 17/402,118, filed on Aug. 13, 2021, now Pat. No. 11,533,205.

(60) Provisional application No. 63/081,077, filed on Sep. 21, 2020.

(51) Int. Cl.
*H04L 25/03* (2006.01)

(52) U.S. Cl.
CPC .. *H04L 25/03885* (2013.01); *H04L 25/03828* (2013.01)

(58) Field of Classification Search
CPC ............ H04L 25/026; H04L 25/03006; H04L 25/03828; H04L 25/03878; H04L 25/03885; H04L 25/03949; H04L 2025/03592; H04L 2025/03611; H04L 2025/03681

USPC ........ 375/229, 232, 236, 316, 346, 348, 350
See application file for complete search history.

(56) References Cited

U.S. PATENT DOCUMENTS

| | | | |
|---|---|---|---|
| 6,956,914 | B2 | 10/2005 | Sivadas et al. |
| 8,270,463 | B1 | 9/2012 | Rane et al. |
| 8,665,940 | B2 | 3/2014 | Palmer |
| 10,038,577 | B2 | 7/2018 | Rane et al. |
| 11,038,723 | B2 | 6/2021 | Rane et al. |
| 2005/0259726 | A1 | 11/2005 | Farjad-rad |
| 2012/0087405 | A1 | 4/2012 | Cheung et al. |

(Continued)

OTHER PUBLICATIONS

International Search Report, PCT/US2021/051178, dated Dec. 9, 2021, 2 pgs.

*Primary Examiner* — Young T. Tse
(74) *Attorney, Agent, or Firm* — John R. Pessetto; Frank D. Cimino

(57) ABSTRACT

A system for selecting an equalizer setting of an equalizer to equalize signals received via a communications link. Starting with a first (e.g., minimum) equalizer setting and a threshold voltage near the mid-eye voltage of the equalized output signal, the system estimates the amplitude of the inner eye of the equalized output signal by comparing the equalized output signal to a series of threshold voltages. If the amplitude of the equalized output signal is less than ideal, the system dynamically increases the equalizer setting. The system quickly converges on the equalizer setting for the communication link because, rather than comparing the output signal at every voltage offset using every equalizer setting, the system only evaluates the equalizer settings necessary to select the equalizer setting for the communications link and uses only the voltage offsets necessary to evaluate each equalizer setting.

20 Claims, 9 Drawing Sheets

(56) References Cited

U.S. PATENT DOCUMENTS

| | | | |
|---|---|---|---|
| 2015/0180642 A1* | 6/2015 | Hsieh | H04L 7/0331 375/232 |
| 2015/0312066 A1* | 10/2015 | Liao | H04L 25/03885 375/232 |
| 2018/0191534 A1 | 7/2018 | Rane et al. | |
| 2020/0021468 A1 | 1/2020 | Sakai | |
| 2021/0248103 A1 | 8/2021 | Khashaba et al. | |

* cited by examiner

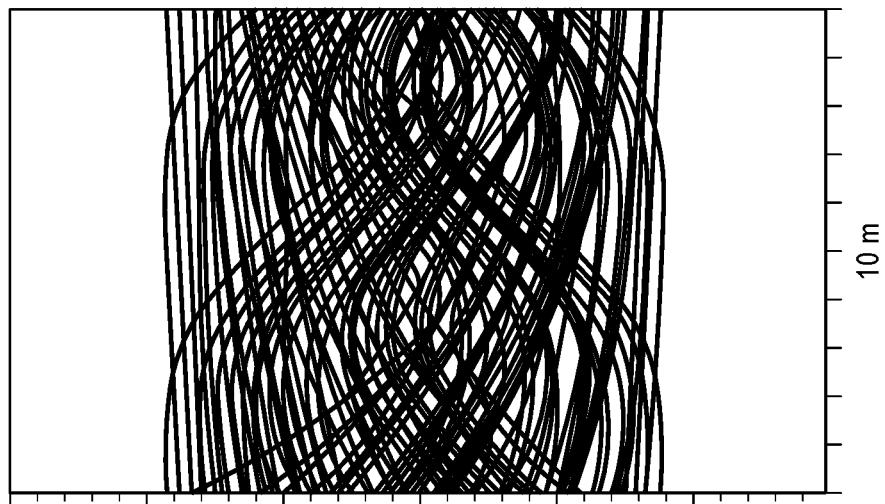
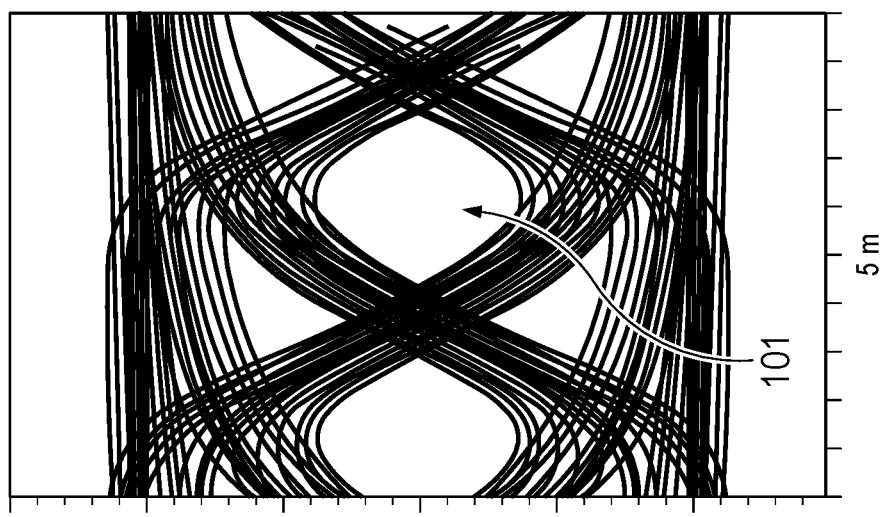
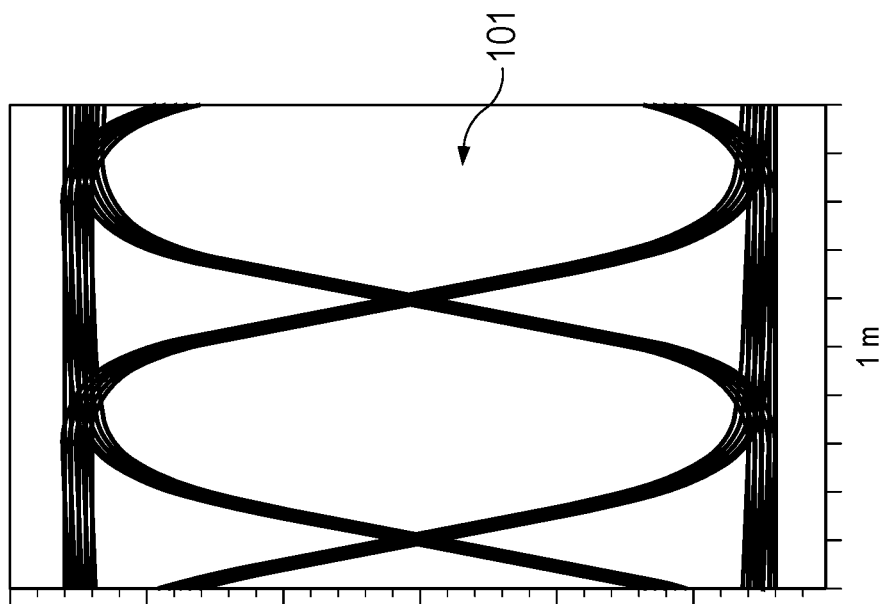
FIG. 1B

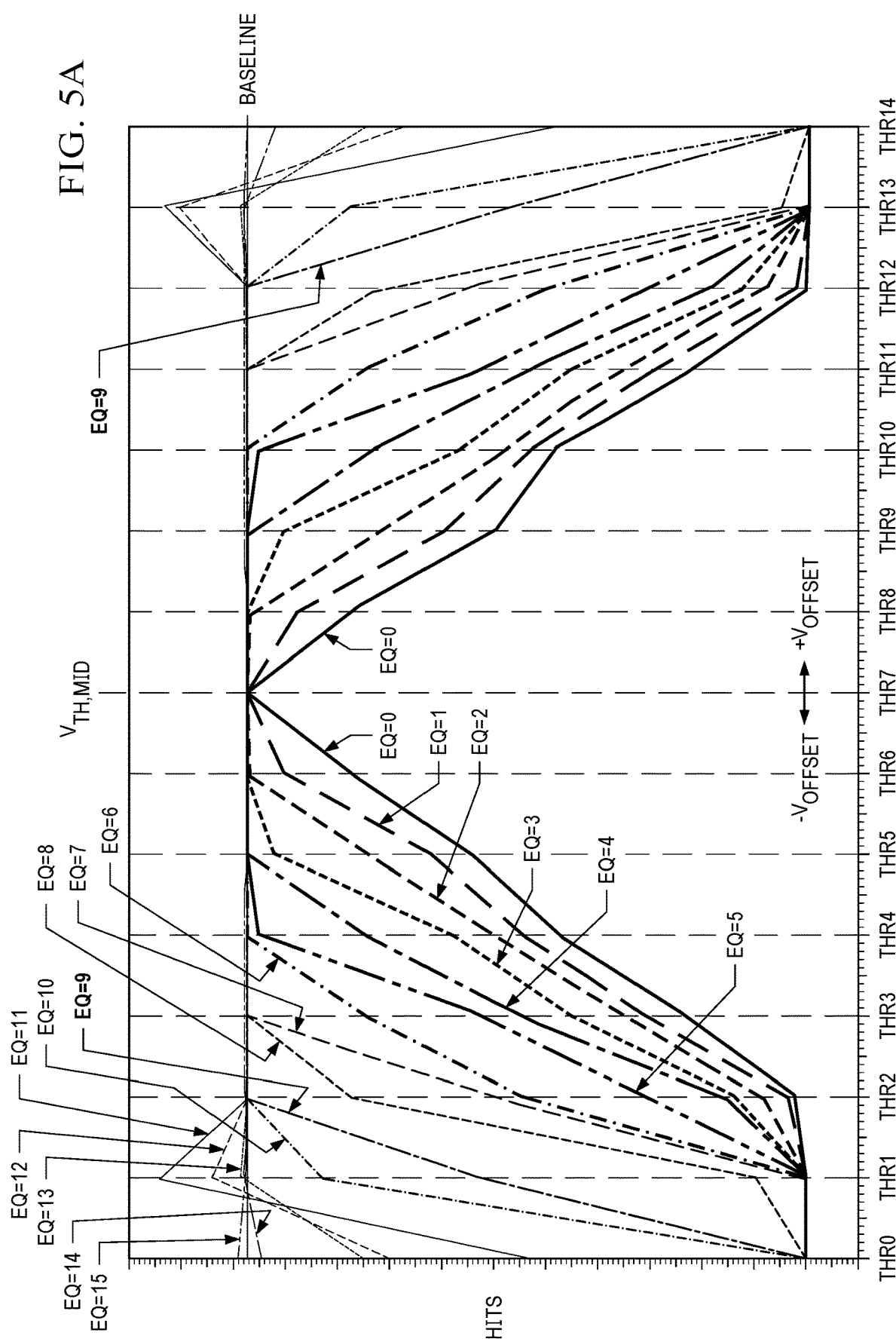

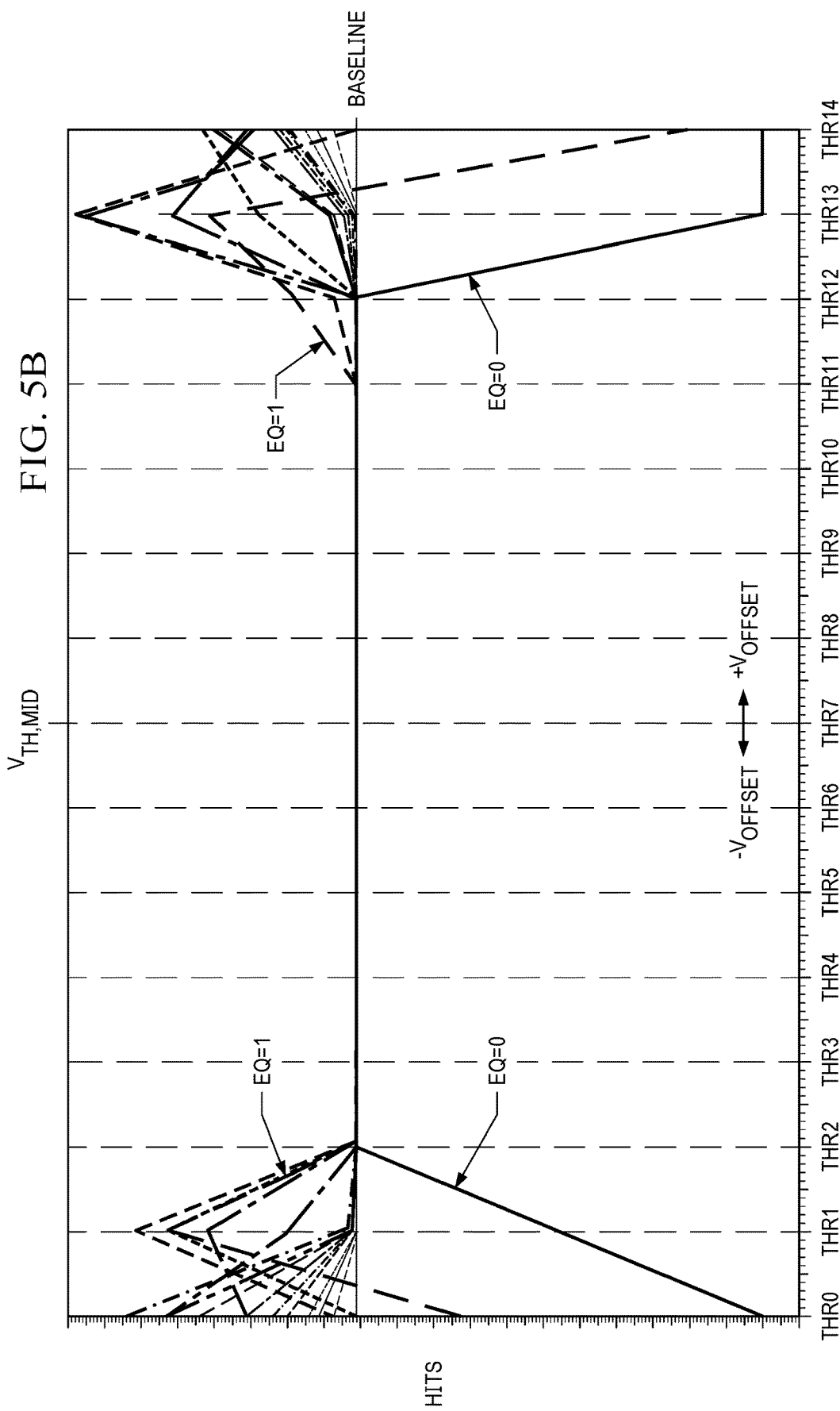

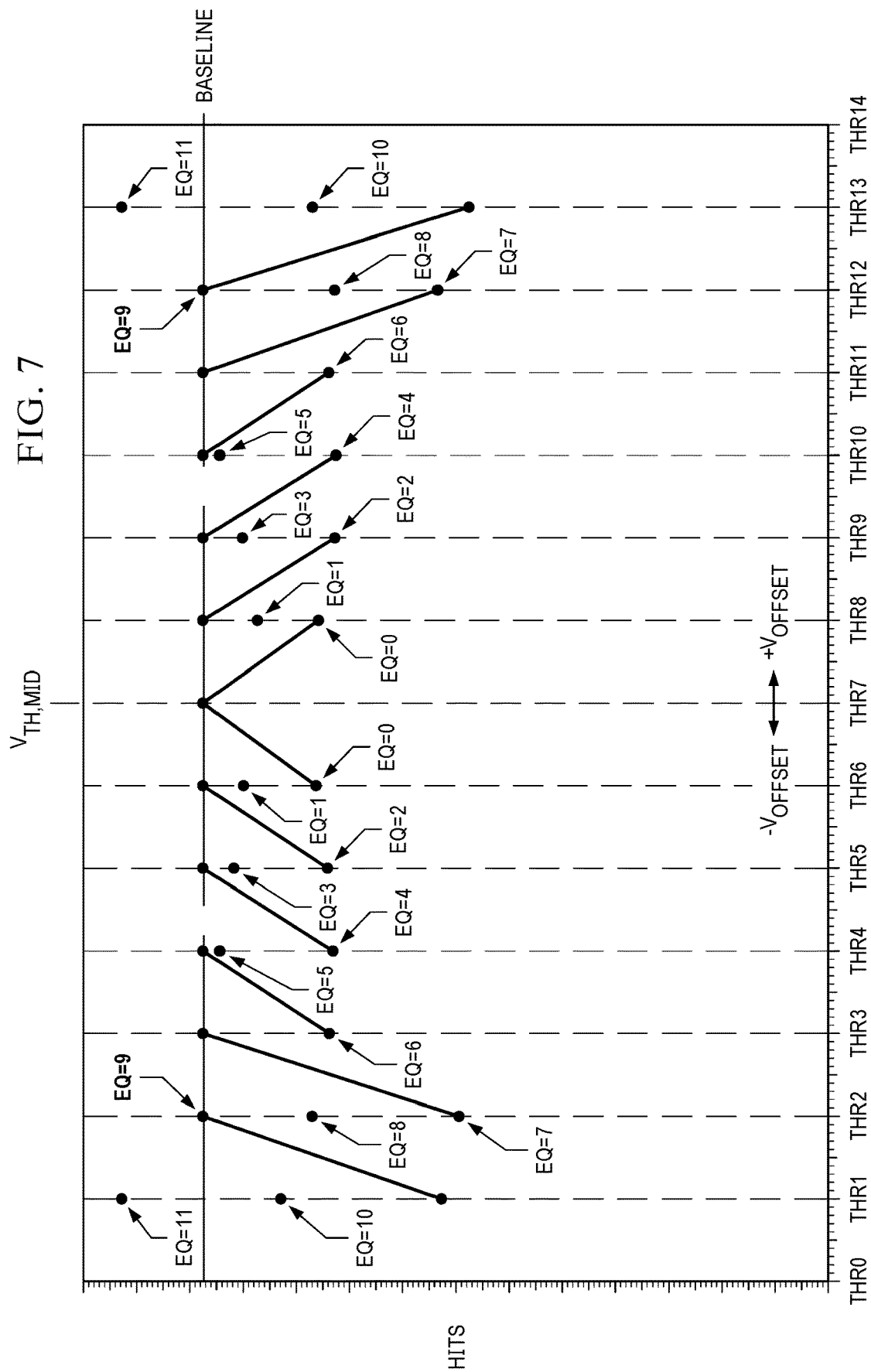

ADAPTIVE EQUALIZER FOR REDRIVER

CROSS-REFERENCE TO RELATED APPLICATIONS

This application is a continuation of U.S. application Ser. No. 17/402,118 filed Aug. 13, 2021 which claims priority to U.S. Provisional Application No. 63/081,077 filed Sep. 21, 2020, which are hereby incorporated by reference.

BACKGROUND

The universal serial bus (USB) interface is one of the most popular computer interfaces. Since its inception, each USB standard released has supported successively higher throughput. The USB 1.x standard, released in 1998, supports data rates of 1.5 to 12 megabits per second (Mbps). USB 3.2 supports two lanes, each with a throughput of 10 gigabits per second (Gbps) over a single interface, However, higher speed USB signals suffer increased signal integrity degradation over long printed circuit board (PCB) traces and USB cables. Insertion loss, which is the loss of signal power resulting from any media in the signal path, is the most common issue.

Other simplex buses, such as High-Definition Multimedia Interface (HDMI), Peripheral Component Interconnect express (PCIe), etc., have similar issues with signal integrity degradation. In addition to long trace and cable connections, signals may also be subject to signal integrity degradation due to cross connectors and capacitance lines.

To increase signal quality, systems typically include a redriver that improves the signal quality of transmitted and received signals, enabling the system to maintain signal integrity at higher data rates and over longer traces and cables.

SUMMARY

A system for selecting an equalizer setting to equalize signals received via a communications link. Starting with a first equalizer setting (e.g., the minimum equalizer setting of an equalizer) and a threshold voltage near the mid-eye voltage of the equalized output signal, the system determines a baseline number indicative of the number of times that the equalized output signal crosses the threshold voltage during a predetermined time interval. The system collects information sufficient to estimate the amplitude of the inner eye of the equalized output signal by increasing a voltage offset from the mid-eye voltage. If the amplitude of the equalized output signal is less than ideal, the system dynamically increases the equalizer setting.

By comparing the equalized output signal to multiple voltage offsets using multiple equalizer settings, the system is able to select the equalizer setting for each newly established communications link (e.g., during link training). At the same time, the process performed by the system is more efficient than prior art processes because it does not compare the equalized output signal at every voltage offset using every equalizer setting. Instead, the system only evaluates the equalizer settings necessary to select the setting for the communications link and only uses the voltage offsets needed to evaluate each of those equalizer settings. By using this efficient process, the controller quickly converges on the equalizer setting to equalize signals received via the communications link by determining if the output signal is over-equalized, the equalizer is set to the maximum equalizer setting, or the eye of the equalized output signal at an equalizer setting is completely open.

BRIEF DESCRIPTION OF THE DRAWINGS

For a detailed description of various examples, reference will now be made to the accompanying drawings in which:

FIG. 1B are eye diagrams illustrating the signal loss of USB signals as cable lengths increase.

FIG. 5A is an example cumulative distribution function for a USB channel.

FIG. 5B is an example cumulative distribution function for a USB channel that is shorter than the USB channel used to generate the example cumulative distribution function of FIG. 5A.

FIG. 7 is a graph illustrating how, according to an illustrative embodiment, the system of FIG. 2 performing the process of FIG. 6 selects the equalizer setting for the example channel of FIG. 5A more efficiently than prior art systems.

DETAILED DESCRIPTION

Figure 1A:
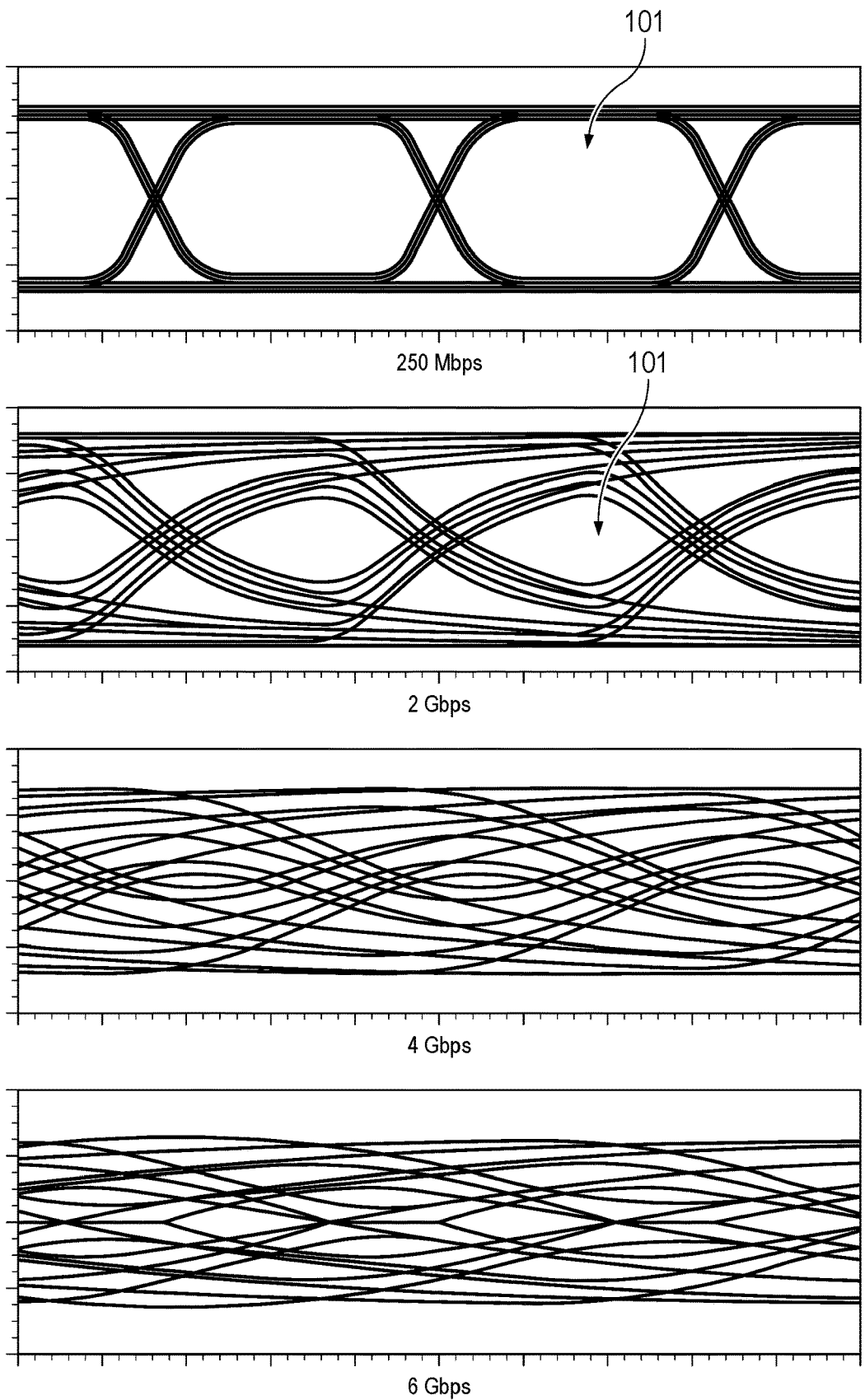
FIG. 1A are eye diagrams illustrating the signal loss of USB signals as data rates increase.

FIG. 1A are eye diagrams (e.g. voltage versus time diagrams) illustrating the signal loss of USB signals (over a 36-inch printed circuit board trace) as data rates increase. At 250 Mbps, the eye 101 is very clean/open, indicating very little signal loss. The eye 101 experiences degradation as speeds are increased to 2 Gbps. At 4 Gbps, the eye 101 is almost dosed, resulting in considerable bit error. Finally, at 6 Gbps, the eye 101 is completely dosed and the system will not be able to decode the data correctly without any signal conditioning.

Similarly, USB signals experience higher signal degradation over longer cable (or circuit board trace) lengths. FIG. 1B are eye diagrams illustrating the signal loss of 10 Gbps USB signals as cable lengths increase. Over a 1-meter (m) cable, the eye 101 is very clean/open, indicating very little signal loss. The eye 101 begins to close as the cable length increases to 5 m and completely closes as the cable length increases to 10 m.

Figure 1C:
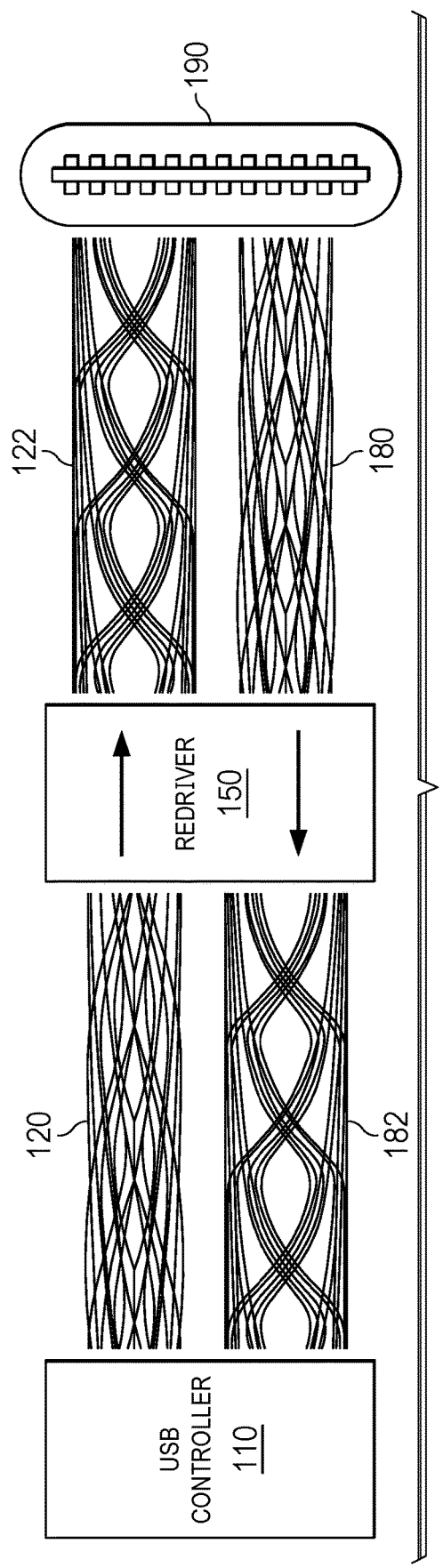
FIG. 1C is a block diagram illustrating a USB redriver.

FIG. 1C is a block diagram illustrating a redriver 150 coupled to a USB controller 110 and a USB port 190. As shown in FIG. 1C the redriver 150 improves the signal quality of transmitted signals 120 and received signals 180, enabling the system to maintain signal integrity at higher data rates and over longer traces and cables. To improve the quality to a transmitted signal 120, the redriver 150 changes the shape of the transmitted signal 120 to generate launch signal 122 that will recover more easily after its attenuation by traveling across the channel.

To improve the quality of a received signal 180, the redriver 150 may include an equalizer that compensates for the attenuation that occurred during transmission by amplifying the received signal 180 and generating an equalized output signal 182. For receive equalization, it is desirable to apply the appropriate amount of equalization. Applying too little gain (under-equalization) can prevent the signal from being recovered properly. Meanwhile, amplifying the received signal 180 by more than the amount that the received signal 180 was attenuated will over-equalize the received signal, which can interfere with the receiver's ability to recover the data. For example, over-equalization may cause excessive amplitude on bit transitions, which could lead to compliance issues with system specifications for logic-high and logic-low level tolerances, and may cause separation of the rising and falling edges (commonly referred to as "double banding"), which can interfere with a receiver's ability to properly detect the frequency or maintain the proper phase relationship with incoming data.

The optimal amount of equalization to maximize signal quality depends on several factors, including the data rate and characteristics of the channel (e.g., the trace and cable length). Therefore, redrivers 150 typically perform receive equalization using an adaptive equalizer and select an equalizer setting for each newly-established communications link. When a new communications link is established, the devices may engage in a link training process, during which a redriver 150 can select the equalizer setting for the newly-established communications link.

U.S. Pat. No. 10,038,577 (incorporated by reference herein in its entirety) describes a system that selects an equalizer setting to equalize a received signal 180. The system of U.S. Pat. No. 10,038,577 determines the preferred equalizer setting by comparing the output signal of the equalizer at every equalizer setting to every one of a number of predetermined threshold voltages. By comparing the equalized output signal at each equalizer setting to each predetermined threshold voltage, the system of U.S. Pat. No. 10,038,577 is eventually able to select an equalizer setting for a newly-establish communications link. However, during link training, the equalizer setting must be selected quickly to minimize the impact on the other link training processes. Meanwhile, the process performed by the system described in U.S. Pat. No. 10,038,577 is inefficient and, therefore, may not select the equalizer setting quickly enough to minimize the impact on the other link training processes.

The disclosed system performs a more efficient process to select the equalizer setting to equalized signals received via a communications link. Instead of employing every equalizer setting and comparing every equalized output signal to every threshold voltage, the system only evaluates the equalizer settings necessary to select the equalizer setting for the communications link and only uses the threshold voltages needed to evaluate each of those equalizer settings.

Figure 2:
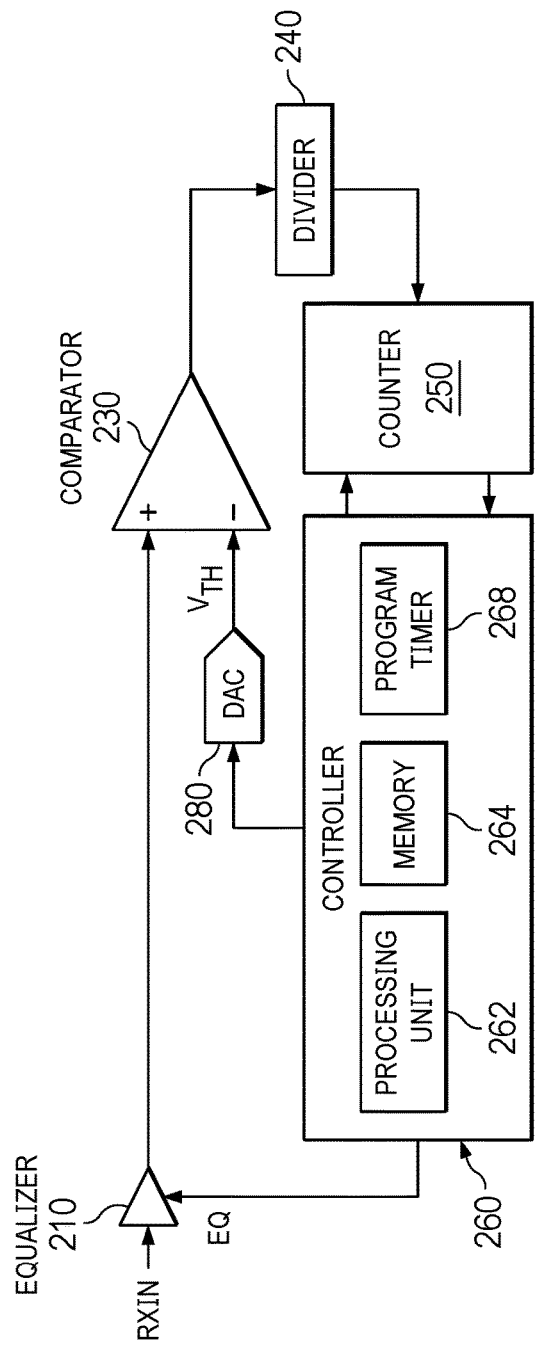
FIG. 2 is a block diagram of a system for determining an equalizer setting to equalize signals received via a communications link according to an illustrative embodiment.

FIG. 2 is a block diagram of an example system 200 for selecting an equalizer setting to equalize signals received via a communications link according to an illustrative embodiment. As shown in FIG. 2, the system 200 may be implemented in a redriver 150, a USB controller 110 and/or USB port 190 in some embodiments, and the system 200 includes an equalizer 210, a comparator 230, a divider 240, a counter 250, a controller 260, and a digital-to-analog converter (DAC) 280. In the example of FIG. 2, the controller 260 includes a processing unit 262, memory 264, and a program timer 268. The equalizer 210 receives a digital input signal RXIN and outputs an equalized output signal. (As shown in FIG. 1, for instance, the equalizer 210 may receive the received signal 180 from the USB port 190 and output the equalized output signal 182.) The equalizer 210 is an adaptive equalizer having multiple pre-set configurations (referred to herein as "equalizer settings") that control the equalization function employed by the equalizer 210. As shown in FIG. 2, the controller 260 is coupled to the equalizer 210, enabling the controller 260 to set the active equalizer setting EQ of the equalizer 210. The controller 260 is also coupled to the analog input of the DAC 280, which enables the controller 260 to specify a threshold voltage $V_{TH}$. For example, the DAC 280 may be configured to output a plurality of predetermined threshold voltages $V_{TH}$, each in response to one of a plurality of predetermined multi-bit control signals from the controller 260. The controller 260 may therefore be configured to output one of the plurality of predetermined threshold voltages $V_{TH}$ to the comparator 230 by outputting the predetermined multi-bit control signal associated with the selected threshold voltage $V_{TH}$ to the DAC 280.

The comparator 230 includes a first input (e.g. the non-inverting input) coupled to the output of the equalizer 210 and a second input (e.g. the inverting input) coupled to the analog output of the DAC 280, enabling the comparator 230 to compare the instantaneous voltage output by the equalizer 210 and the threshold voltage $V_{TH}$ specified by the controller 260. In the example of FIG. 2, for instance, the output of the equalizer 210 is coupled to the positive input of the comparator 230 and the analog output of DAC 280 is coupled to the negative input of the comparator 230. Accordingly, in that embodiment, the output of the comparator 230 is high when the instantaneous voltage output by the equalizer 210 is greater than the threshold voltage $V_{TH}$ specified by the controller 260 and the output of the comparator 230 is low when the instantaneous voltage output by the equalizer 210 is less than the threshold voltage $V_{TH}$ specified by the controller 260. Therefore, in the example of FIG. 2, the comparator 230 outputs a rising signal edge each time the instantaneous voltage of the equalized output signal rises to a voltage greater than the threshold voltage $V_{TH}$. In other embodiments, the inputs of the comparator 230 may be reversed such that the output of the comparator 230 is high when the instantaneous voltage output by the equalizer 210 is less than the threshold voltage $V_{TH}$ specified by the controller 260 and the output of the comparator 230 is low when the instantaneous voltage output by the equalizer 210 is greater than the threshold voltage $V_{TH}$ specified by the controller 260. In those embodiments, the comparator 230 outputs a rising signal edge each time the instantaneous voltage of the equalized output signal falls to a voltage less than the threshold voltage $V_{TH}$ and outputs a falling signal edge each time the instantaneous voltage of the equalized output signal rises to a voltage greater than the threshold voltage $V_{TH}$.

The counter 250 is a digital counter that stores a binary, incrementing value indicative of the number of times that the instantaneous voltage of the equalized output signal rises to a voltage greater than the threshold voltage $V_{TH}$ specified by the controller 260. Because the output of the comparator 230 may have a higher frequency than the operating frequency of the counter 250, the comparator 230 may be coupled to the counter 250 via a divider 240. In the example of FIG. 2, for instance, the output of the comparator 230 is coupled to the counter 250 via the divider 240, which divides the output of the comparator 230 by outputting one signal edge for every N signal edges output by the comparator 230. In one example, N is eight, and the divider 240 outputs one signal edge for every eight signal edges output by the comparator. Accordingly, the counter 250 of FIG. 2 counts the rising signal edges output by the comparator 230 (each indicating that the equalized output signal rose to cross the threshold voltage $V_{TH}$) as divided by the divider 240. (In other embodiments, the output of the comparator 230 may be coupled to the counter 250 without the intervening divider 240. Additionally, in other embodiments, the counter 250 may be configured to count falling signal edges output by the comparator 230 or divider 240 or both rising and falling signal edges output by the comparator 230 or divider 240.)

In the example of FIG. 2, the controller 260 is coupled to the counter 250, enabling the controller 260 to read the value stored in the counter 250 and to output control signals to the counter 250 to start, pause, or reset counting. As described below with reference to FIG. 3, for example, the controller 260 may assert an enable counting signal, causing the counter 250 to begin counting the signals output by the comparator 230 (in some embodiments, as divided by the divider 240) until the controller 260 deasserts the enable counting signal. In other embodiments, the controller 260 may assert a separate disable or pause counting signal.

The program timer 268 defines a predetermined time interval during which the counter 250 counts a number indicative of the number of times that the equalized output signal from the equalizer 210 rises and crosses a selected threshold voltage $V_{TH}$ (as detected by the comparator 230 and, in some embodiments, divided by the divider 240).

The predetermined time interval is sufficiently long to enable the system 200 to compare the equalized output signal of the equalizer 210 to the selected threshold voltage $V_{TH}$ over multiple cycles of the equalizer 210. In some embodiments, the predetermined time interval may be constant. In other embodiments, the predetermined time interval may be selected, for example by the controller 260, based on the frequency of the equalized output signal of the equalizer 210. For example, the predetermined time interval may be shorter for higher frequency output signals from the equalizer 210 and longer for lower frequency output signals from the equalizer 210 so that the system 200 can compare the equalized output signal of the equalizer 210 to the selected threshold voltage $V_{TH}$ over similar numbers of cycles regardless of the frequency of the output signals.

The controller 260 may include any hardware device suitably configured to perform the functions described herein. In some embodiments, for example, the controller 260 may be a hardware state machine configured to perform the functions described herein. In the embodiment of FIG. 2, the controller 260 includes a processing unit 262 (e.g., a microprocessor, microcomputer, microcontroller and/or processor implemented on an integrated circuit chip) and memory 264 e.g., non-transitory computer readable storage media, volatile memory and/or non-volatile memory) storing instructions that, when executed by the processing unit 262, cause the processing unit 262 to perform the functions herein.

As mentioned above, the equalizer 210 is configured to amplify signals received from another device via a communications link (e.g., USB, HDMI, PCIe, etc.). The equalizer 210 may be a continuous time linear equalizer (CTLE), a decision feedback equalizer (DFE), a feed-forward equalizer (FFE), or any other suitable type of equalizer. The equalizer 210 has a plurality of equalizer settings that control the equalization function employed by the equalizer 210. For instance, the equalizer 210 may include sixteen equalizer settings, referred to herein as "equalizer setting 0" through "equalizer setting 15." Those equalizer settings may include a minimum equalizer setting (equalizer setting 0) that, from among the plurality of equalizer settings, causes the equalizer 210 to perform the least amount of signal equalization and introduce the least amount of signal gain. The plurality of equalizer settings may increase incrementally, in this example from equalizer setting 0 to equalizer setting 15, with each incrementally larger equalizer setting performing a larger amount of signal equalization and introducing more signal gain. Finally, the plurality of equalizer settings may include a maximum equalizer setting (in this example, equalizer setting 15) that, from among that plurality of equalizer settings, that causes the equalizer 210 to perform the highest amount of signal equalization and introduce the highest amount of signal gain.

The equalizer 210 amplifies signals received via a communications link to compensate for attenuation that occurred along that communications link. Because the amount of attenuation varies for each communications link, the optimal amount of equalization to compensate for that attenuation varies for each communications link. The amount of equalization performed by the equalizer 210 depends on the equalizer setting of the equalizer 210. Accordingly, the equalizer setting selected to equalize signals received via each communications link varies for each communications link. Therefore, during link training for a newly-established communications link, the system 200 enables the controller 260 to perform a calibration process to select the equalizer setting of the equalizer 210 for equalizing signals received via the newly-established communications link.

During link training, each device generates and sends a training pattern specified by the relevant communications standard (e.g., USB, HDMI, PCIe, etc.). During USB link training, for instance, the USB system on chip (SOC) of the host generates and sends the training pattern to the USB device and the USB SOC of the USB device generates and sends the training pattern to the host. During link training, the equalizer 210 receives the training pattern that is generated by the device at the other end of the communications link and attenuated over the course of the communications link. The equalizer 210 amplifies the attenuated training pattern in accordance with the active equalizer setting EQ of the equalizer 210 and outputs an equalized output signal.

To select the equalizer setting to equalize signals received via the newly-established communications link, the system 200 enables the controller 260 to evaluate each equalizer setting of the equalizer 210 by dynamically setting the active equalizer setting EQ of the equalizer 210 and estimating the amplitude of the inner eye of the equalized output signals generated using each equalizer setting. To estimate the amplitude of the inner eye of each equalized output signal, the system 200 enables the controller 260 to output a series of threshold voltages $V_{TH}$ to the comparator 230 and use the counter 250 to count a number indicative of the number of times that each equalized output signal rises to cross each threshold voltage $V_{TH}$ during the predetermined time period. Furthermore, the process 600 performed by the controller 260 to select the equalizer setting for the newly-established communications link is more efficient than conventional methods. Instead of employing every equalizer setting and comparing every equalized output signal to every threshold voltage $V_{TH}$, the system 200 only evaluates the equalizer settings necessary to select the equalizer setting for the communications link and only uses the threshold voltages $V_{TH}$ needed to evaluate each of those equalizer settings. As described below with reference to FIGS. 6 and 7, if the equalized output signal crosses threshold voltages $V_{TH}$ fewer than a baseline number of times, the controller 260 increases the active equalizer setting EQ of the equalizer 210 and estimates the amplitude of the inner eye of the equalized output signals generated using the increased equalizer setting. By using this efficient process 600, the controller 260 quickly selects the equalizer setting to equalize signals received via the newly-established communications link by determining if the output signal is over-equalized, the equalizer 210 is set to the maximum equalizer setting, or the eye of the equalized output signal generated using one of the equalizer settings is completely open.

Figure 3:
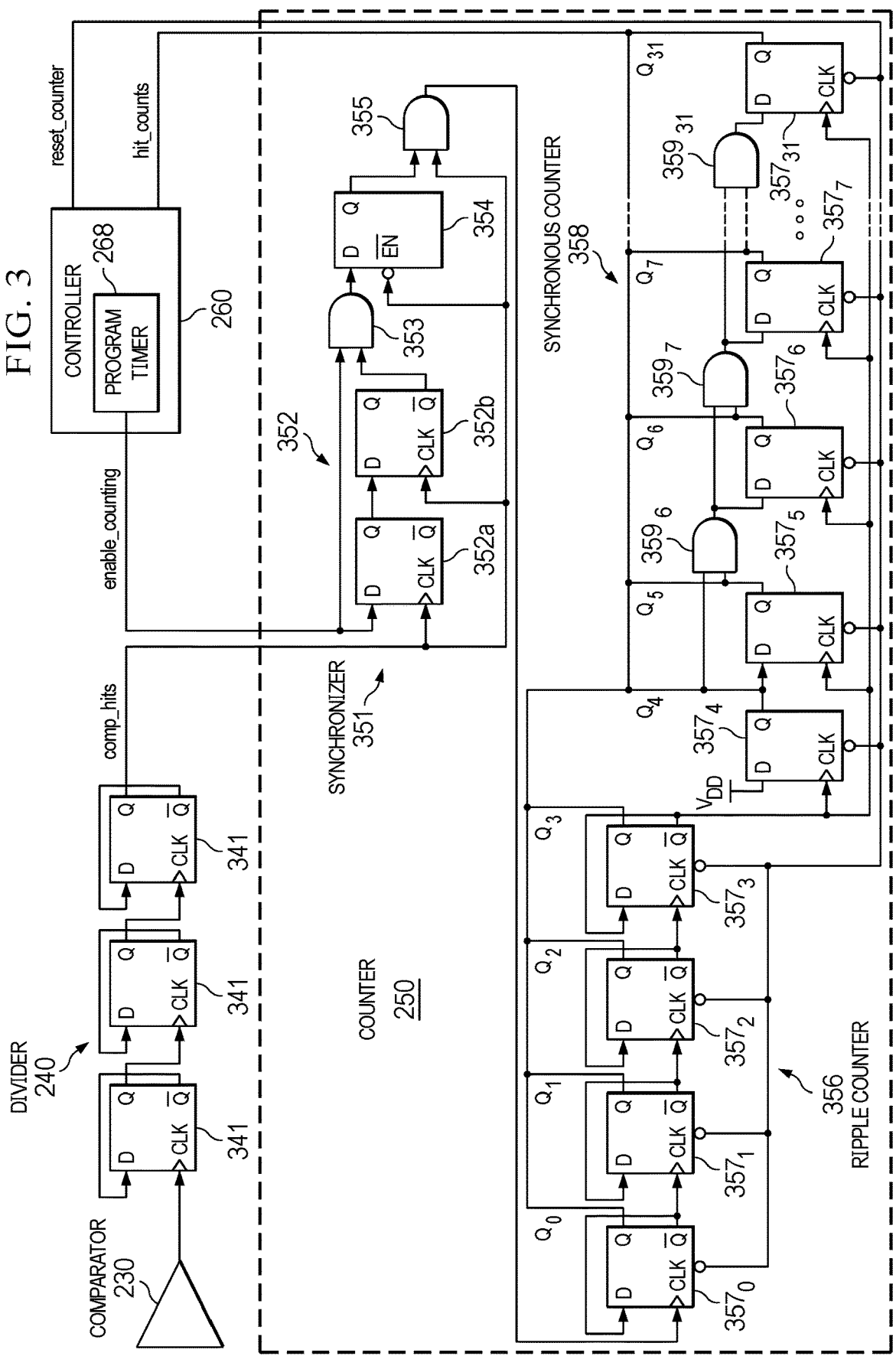
FIG. 3 is a block diagram of a divider and a counter according to an illustrative embodiment.

FIG. 3 is a block diagram of the divider 240 and the counter 250 according to an illustrative embodiment. The divider 240 may be any circuit that outputs one signal edge for every N signal edges output by the comparator 230. The divider 240 may include, for example, n toggle flip flops 341 that each output one signal edge for every two signal edges received. In those embodiments, the divider divides the signal edges by N, where $N=2^n$. In the example of FIG. 3, for instance, divider 240 includes three toggle flip flops 341 that collectively divide the signal edges output by the comparator 230 by $2^3$, or 8.

In the example of FIG. 3, the counter 250 includes a synchronizer 351, a ripple counter 356, and a synchronous counter 358. The synchronizer 351 may be any digital circuit configured to convert signals received by the counter 250 into the clock domain of the counter 250, enabling the counter 250 to capture asynchronous signals without introducing metastability failure. In the example of FIG. 3, the divider 240 is coupled to the synchronizer 351 via a comp_hits signal line and the controller 260 is coupled to the synchronizer 351 via an enable_counting signal line. The synchronizer 351 receives signals from the divider 240, including rising signal edges indicating that the instantaneous voltage of the equalizer output signal of the equalizer 210 crossed a threshold voltage $V_{TH}$ specified by the controller 260. When the controller 260 asserts an enable counting signal via the enable_counting signal line, the synchronizer 351 outputs signals to in response to each signal received from the divider 240. When the enable counting signal from the controller 260 is deasserted, the synchronizer 351 ignores any additional signals from the comparator 230.

In the example of FIG. 3, the synchronizer 351 includes two flip flop synchronizer 352, which includes a first flip flop 352a and a second flip flop 352b. The second flip flop 352b (e.g. via the Q-bar output) is coupled to a first AND gate 353, which is coupled to a latch 354, which is coupled to a second AND gate 355. (As one of ordinary skill in the art will recognize, in other embodiments the synchronizer 351 may be implemented using any of a number of alternative configurations.) The divider 240 is coupled to the clock inputs of the two flip flop synchronizer 352 via the comp_hits signal line. The controller 260 is coupled to the data input (D) of the first flip flop 352a of the two flip flop synchronizer 352 via the enable_counting signal line. While the enable_counting signal is asserted, the two flip flop synchronizer 352 outputs a copy of the enable signal, which is synchronous to the comp_hits signal, in response to signal edges received via the comp_hits line. While the enable_counting signal and the synchronous copy are asserted, the first AND gate 353 outputs a constant enable. The latch 354 latches the output of the first AND gate 353 each time the signal output by the divider 240 via the comp_hits signal line is low. The second AND gate 354 outputs comp_hits pulses while the output of the latch 354 is high. Accordingly, the synchronizer 351 converts signals output by the divider 240 into the clock domain of the counter 250 and provides those signals to the ripple counter 356.

In the example of FIG. 3, the synchronizer 351 is coupled to the ripple counter 356, which is coupled to the synchronous counter 358. The controller 260 is coupled to the ripple counter 356 and the synchronous counter 358 via a hit_counts signal line and a reset_counter signal line. To keep up with the frequency of the output signals from the divider 240, the ripple counter 356 is a sufficiently fast counter. Meanwhile, the synchronous counter 358 counts the number of times that the ripple counter 356 counts past its maximum count value and resets. (In other embodiments, the functions of both the ripple counter 356 and the synchronous counter 358 may be performed by a single counter that is both sufficiently fast to keep up with the frequency of the output signals from the comparator 230 or divider 240 and includes a sufficient number of bits to count the number of times that the threshold voltage $V_{TH}$ has been crossed during the predetermined time interval.) In the example of FIG. 3, the ripple counter 356 is a 4-bit counter, realized by four flip flops $357_0$ through $357_3$, and the synchronous counter 358 is a 28-bit counter, realized using twenty eight flip flops $357_4$ through $357_{31}$ and twenty six AND gates $359_6$ through $359_{31}$. (In other embodiments, the ripple counter 356 and/or the synchronous counter 358 may store any number of bits.) In the example of FIG. 3, the 4-bit ripple counter 356 counts from its reset state of 0000 to its maximum count value of 1111, at which time the not-Q (also referred to as Q-bar) output of the flip flop $357_3$ outputs a signal to the 28-bit synchronous counter 358 to increment its count value by one. In the example of FIG. 3, the 4-bit ripple counter 356 and the 28-bit synchronous counter 358 produce a 32-bit count value, which is output via the Q outputs of the flip flops $357_0$ through $357_3$ to the controller 260 via the hit_counts signal line. The ripple counter 356 and the synchronous counter 358 then reset their count values in response to a signal received from the controller 260 via the reset_counter signal line.

In the example of FIGS. 2-3, the counter 250 is configured to count the number of rising signal edges, which are each output by the comparator 230 (and, in some embodiments, divided by the divider 240) when the equalized output signal rises to a voltage greater than the selected threshold voltage $V_{TH}$. In other embodiments, however, the counter 250 may count the total number of times that the equalized output signal voltage crosses the selected threshold voltage $V_{TH}$ (in some embodiments, as divided by the divider 240), regardless of whether the equalized output signal voltage is increasing or decreasing. In those embodiments, for instance, the comparator 250 may be configured to count the total number of rising and falling signal edges output by the comparator 230 or divider 240.

Figure 4A:
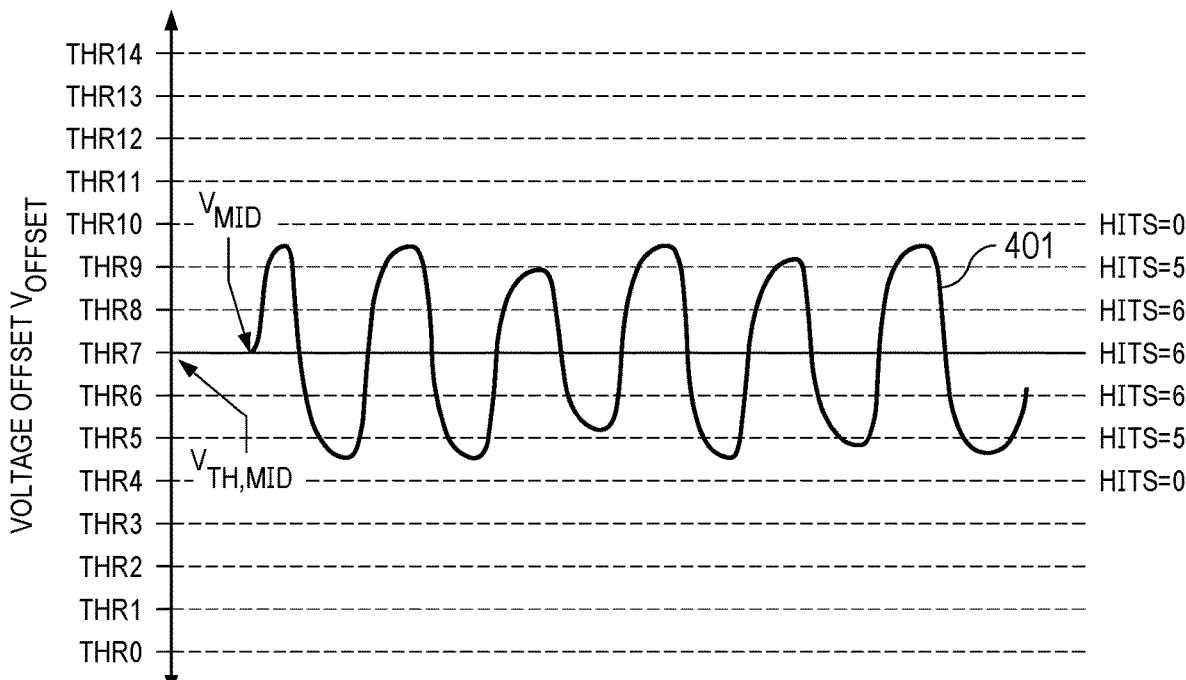
FIG. 4A is a waveform of an example equalized output signal using a first equalizer setting.

FIG. 4A is an example waveform of an equalized output signal 401 output by the equalizer 210 using a first equalizer setting. The horizontal axis represents time and the vertical axis represents voltage (where each gradation represents a different threshold voltage THR0-THR14). As shown in FIG. 4A, the equalized output signal 401 oscillates above and below the voltage $V_{MID}$ at mid-eye. Meanwhile, in the example of FIG. 2 described above, the controller 260 is configured to output each of a plurality of predetermined threshold voltages $V_{TH}$ (e.g., fifteen threshold voltages from THR0 through THR14) to the comparator 250 (by outputting each of a plurality of predetermined control signals to the DAC 280). The threshold voltages (e.g., THR0 through THR14) may be a range of discrete voltage levels distributed evenly (or unevenly) between an expected minimum voltage level THR0 and an expected maximum voltage level THR14 of the equalized output signal output by the equalizer 210. In those embodiments, the number of threshold voltages $V_{TH}$ output by the controller 260 may be odd and the median threshold voltage $V_{TH}$ (e.g., THR7) may be at or near the mid-eye voltage $V_{MID}$ of the equalized output signal 401. In other embodiments, the number of threshold voltages may be even, for example with two threshold voltages $V_{TH}$ at or near the mid-eye voltage $V_{MID}$.

Using the counter 250, the controller 260 can then determine whether the eye of the equalized output signal is open by counting the number of times ("hits") that the instantaneous voltage of the equalized output signal 401 increases to a voltage greater than each of the specified threshold voltages THR0 through THR14 during the predetermined time interval. To use as a baseline, the controller 260 counts the number of hits at the threshold voltage $V_{TH}$ nearest to the mid-eye voltage $V_{MID}$ (referred to herein as the mid-eye threshold voltage $V_{TH,MID}$). As shown in FIG. 4A, for example, the controller 260 may output the threshold voltage THR7 and count the number of times that the equalized output signal 401 voltage increases to a voltage greater than the threshold voltage THR7 during the predetermined time interval implemented by the program timer 268. In the example shown in FIG. 4A, the equalized output signal 401 rises and crosses the threshold voltage THR7 six times (HITS=6).

The controller 260 may then select the threshold voltage $V_{TH}$ that is incrementally greater than the mid-eye threshold voltage $V_{TH,MID}$ (e.g., THR8) and count the number of times that the output signal 401 voltage increases to a voltage greater than the selected threshold voltage THR8 over the same predetermined time interval. In the example shown in FIG. 4A, the rising equalized output signal 401 again crosses the threshold voltage THR8 six times (HITS=6). The controller 260 may also select the threshold voltage $V_{TH}$ that is incrementally less than the mid-eye threshold voltage $V_{TH,MID}$ (e.g., THR6) and count the number of times that the equalized output signal 401 voltage increases and crosses the selected threshold voltage THR6 over the same predetermined time interval (in this example, six times).

As shown in FIG. 4A, by selecting threshold voltages THR8 and THR6 that are greater than and less than the mid-eye threshold voltage $V_{TH,MID}$, the system 200 increases a voltage offset VOFFSET from the mid-eye threshold voltage $V_{TH,MID}$. The system 200 may then incrementally increase the voltage offset $V_{OFFSET}$ (e.g., by selecting the threshold voltages THR9 and THR5 and then selecting the threshold voltages THR10 and THR4) and count the number of hits at each of the selected threshold voltages $V_{TH}$.

By increasing the voltage offset VOFFSET and counting the number of hits at the selected threshold voltages $V_{TH}$, the controller 260 can estimate the amplitude of the inner eye of the equalized output signal 401 for the active equalizer setting EQ. If the number of hits at a selected voltage offset $V_{OFFSET}$ are equal to the baseline number of hits at the mid-eye threshold voltage $V_{TH,MID}$, the eye of the equalized output signal 401 is considered "open." The amplitude of the inner eye of the equalized output signal 401 becomes apparent when the voltage offset VOFFSET is further increased to threshold voltages $V_{TH}$ where the number of hits drop below the baseline number of hits at the mid-eye threshold voltage $V_{TH,MID}$ (and the eye of the equalized output signal 401 is considered "closed"). For the example equalizer setting illustrated in FIG. 4A, the number of hits drops below the baseline (in this example, 6 hits) when the voltage offset $V_{OFFSET}$ is increased to the threshold voltages THR9 and THR5.

Figure 4B:
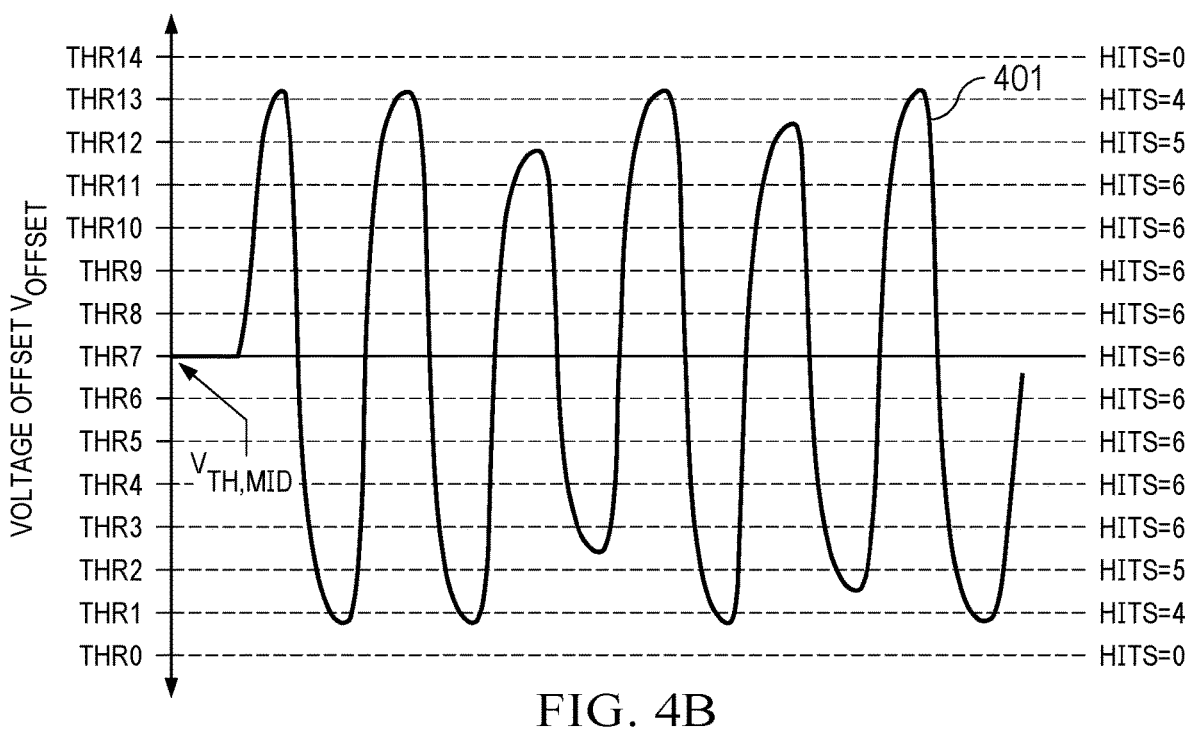
FIG. 4B is a waveform of the example equalized output signal of FIG. 4A using a second equalizer setting.

Having estimated the amplitude of the equalized output signal 401 as shown in FIG. 4A, the controller 260 may increase the active equalizer setting EQ of the equalizer 210 and determine whether the newly specified equalizer setting increases the amplitude of the equalized output signal 401, for example as shown in FIG. 4B.

FIG. 4B is a waveform of the example equalized output signal 401 output by the equalizer 210 using a second equalizer setting. Again, the number of hits (in this example, 6) at the mid-eye threshold voltage $V_{TH,MID}$ (in this example, the threshold voltage THR7) may be used as a baseline. The controller 260 may then repeatedly increase the voltage offset $V_{OFFSET}$ and count the number of hits at threshold voltages $V_{TH}$ that are incrementally greater than and incrementally less than the mid-eye threshold voltage $V_{MID,TH}$. In the example shown in FIG. 4B, the equalized output signal 401 rises and crosses each of the threshold voltages THR3 through THR11 six times. The number of hits only drops off (in this example, to 5) when the voltage offset $V_{OFFSET}$ is further increased to the threshold voltages THR13 and THR2.

In some instances, an error condition may exist (e.g., a data-path offset, clock frequency instability, comparator metastability, etc.) such that the number of hits at the selected voltage offsets $V_{OFFSET}$ is not indicative of the amplitude of the inner eye of the equalized output signal. If such an error condition persists, the equalizer settings cannot be reliably evaluated using the number of hits. However, if such an error condition exists, the equalized output signal 401 is unlikely to have a reasonably symmetrical shape around the mid-eye voltage $V_{MID}$. Therefore, by counting the numbers of hits at a voltage offset $V_{OFFSET}$ both greater than and less than the mid-eye threshold voltage $V_{TH,MID}$, the controller 260 can ensure that no error condition exists (and ensure that the number of hits can be reliably used to evaluate each equalizer setting) by confirming that the equalized output signal 401 has a reasonably symmetrical shape around the mid-eye voltage $V_{MID}$.

By using the number of hits at the mid-eye threshold voltage $V_{TH,MID}$ as a baseline, the controller 260 can also quickly determine if the output signal is over-equalized. If the output signal is over-equalized, the number of hits using at least one of the voltage offsets $V_{OFFSET}$ will be higher than the baseline while the number of hits using another voltage offset $V_{OFFSET}$ will be equal to or lower than the baseline. Therefore, if the number of hits at a voltage offset $V_{OFFSET}$ is more than the number of hits at the mid-eye threshold voltage $V_{TH,MID}$, then the controller 260 can determine that the active equalizer setting EQ causes the equalizer 210 to over-equalize the output signal.

Selecting the equalizer setting to equalized signals received via a communications link is best illustrated by looking at a full cumulative distribution function showing the number of hits at each threshold voltage $V_{TH}$ using each of the equalizer settings of the equalizer 210.

FIG. 5A is an example cumulative distribution for a first USB channel. The horizontal axis represents threshold voltages $V_{TH}$ and the the vertical axis represents the number of hits (e.g., the number of times that the instantaneous voltage of the equalized output signal output by the comparator 210 crosses the threshold voltage $V_{TH}$). A full cumulative distribution shows the number of hits at each threshold voltage $V_{TH}$ using each equalizer setting (e.g., equalizer setting 0 through equalizer setting 15).

In the example cumulative distribution of FIG. 5A, the number of hits recorded at the mid-eye threshold voltage $V_{TH,MID}$ (in this example, the threshold voltage THR7) may be used as a baseline. Using equalizer setting 0 (EQ=0), the number of hits drops below the baseline when the voltage offset $V_{OFFSET}$ is first increased to the threshold voltages THR6 and THR8. The same is true at equalizer setting 1 (EQ=1). Further increasing the equalizer setting, however, increases the amplitude of the output signal and causes the output signal to record the baseline number of hits using an increasingly large voltage offset $V_{OFFSET}$. Using equalizer setting 9 (EQ=9), for instance, the equalized output signal maintains the baseline number of hits while the voltage offset $V_{OFFSET}$ is increased all the way to the threshold voltages THR2 and THR12. The number of hits recorded using equalizer setting 9 does not drop below the baseline until the voltage offset $V_{OFFSET}$ is further increased to the threshold voltages THR1 and THR13.

As shown in FIG. 5A, increasing the equalizer setting to equalizer setting 10 (EQ=10) does not meaningfully improve the equalized output signal, as the equalized output signal still does not record the baseline number of hits at the threshold voltages THR1 and THR13. Meanwhile, at equalizer setting 11 (EQ=11), the output signal shown in FIG. 5A is over-equalized and, therefore, records more hits at the threshold voltages THR1 and THR13 than the baseline number of hits at the mid-eye threshold voltage $V_{TH,MID}$).

The equalizer setting selected to equalize signals received via a communications link is the lowest equalizer setting of the equalizer 210 that causes the equalized output signal to maintain the baseline number of hits at the highest voltage offset $V_{OFFSET}$. The lowest equalizer setting is the setting, from among the equalizer settings of the equalizer 210, where the equalizer 210 performs the least amount of signal equalization and causes the least amount of signal gain. Accordingly, equalizer setting 9 is the equalizer setting to equalize signals received via the example USB channel used to generate the cumulative distribution function shown in FIG. 5A because using equalizer setting 9 causes the equalized output signal to maintain the baseline number of hits at the voltage offset VOFFSET to threshold voltages THR2 and THR12, further increasing the active equalizer setting to equalizer setting 10 does not cause the equalized output signal to maintain the baseline number of hits at a higher voltage offset VOFFSET, and further increasing the equalizer setting to equalizer setting 11 over-equalizes the equalized output signal.

As mentioned above, the equalizer setting for equalizing signals received via each communications link varies depending on many factors, including the channel length.

FIG. 5B is an example cumulative distribution function for a second USB channel, which is shorter than the first USB channel used to generate the example cumulative distribution function of FIG. 5A. As shown in FIG. 5B, the equalizer to equalize signals received via the second USB channel is equalizer setting 0 (EQ=0), because the equalized output signal maintains the baseline number of hits (recorded at the mid-eye threshold voltage $V_{TH,MID}$, which is again the threshold voltage THR7 in this example) at a voltage offset $V_{OFFSET}$ to the threshold voltages THR2 and THR13. Meanwhile, increasing the equalizer setting to equalizer setting 1 (EQ=1) over-equalizes the output signal and, therefore, causes the output signal to record more than the baseline number of hits using a voltage offset $V_{OFFSET}$ to the threshold voltages THR1 and THR12.

As described above, the number of "hits" may be equal to the number of times that the instantaneous voltage of the equalized output signal rises to a voltage that is greater than the selected threshold voltage $V_{TH}$ during a predetermined time interval. However, as described above, in some embodiments, the counter 250 may count signal edges indicating that the equalized output signal fell to a voltage that is less than the selected threshold voltage $V_{TH}$ (or all signal edges indicating that the equalized output signal crossed the selected threshold voltage $V_{TH}$ in either direction). Meanwhile, in the example of FIG. 2, the divider 240 divides the output of the comparator 230 (in that example, by 8) and outputs the divided output of the comparator 230 to the counter 250. Accordingly, the number of "hits" recorded by the system 200 may be indicative of—but not necessarily equal to—the number of times that the equalized output signal crosses the selected threshold voltage $V_{TH}$ (while rising, falling, or both) during the predetermined time interval.

Additionally, as described above, the controller 260 compares the number of hits at various threshold voltages $V_{TH}$ to determine whether the eye of the equalized output signal is open or closed, if an error condition exists, or if the output signal is over-equalized. For instance, the eye of the equalized output signal is considered "open" if the number of hits at a voltage offset $V_{OFFSET}$ are both equal to a baseline number of hits at a mid-eye threshold voltage $V_{TH,MID}$. However, if the eye of the equalized output signal is open, the number of hits at the voltage offset $V_{OFFSET}$ may be slightly below or above the baseline. Accordingly, the controller 260 may determine that the eye of the equalized output signal is open if both numbers of hits at the selected voltage offset $V_{OFFSET}$ (both above and below the mid-eye threshold voltage $V_{TH,MID}$) are both within a predetermined margin of the baseline. By extension, the controller 260 may determine that the eye of the equalized output signal is closed if either number of hits at the selected voltage offset $V_{OFFSET}$ (either above or below the mid-eye threshold voltage $V_{TH,MID}$) is less than the baseline by an amount equal to or greater than the predetermined margin. Additionally, the controller 260 may determine that the output signal is over-equalized if either number of hits at the selected voltage offset $V_{OFFSET}$ (either above or below the mid-eye threshold voltage $V_{TH,MID}$) is greater than the baseline by an amount equal to or greater than the predetermined margin. A similar predetermined margin may be used when determining if an error condition exists. The predetermined margin may be a percentage of the baseline, an integer, etc.

Given sufficient time, the equalizer setting for a new communications link may be selected by generating a full cumulative distribution function, such as those shown in FIGS. 5A and 5B, for each newly established communications link. The system described in U.S. Pat. No. 10,038,577, for instance, effectively generates a full cumulative distribution function by comparing the output signal of the equalizer at every equalizer setting to every predetermined threshold voltage. However, as mentioned above, it is desirable to select the equalizer setting as quickly as possible in order to minimize the impact on the other link training processes. Meanwhile, the full cumulative distribution function includes more information than is necessary to select the equalizer setting to equalize the signals received via the communications link.

Referring back to FIG. 5A briefly, using the equalizer setting 0 (EQ=0), the numbers of hits at the threshold voltages THR6 and THR8 are below the baseline by more than the predetermined margin. Therefore, there is no need to further increase the voltage offset $V_{OFFSET}$ using equalizer setting 0. It can be assumed that the number of hits will further decrease at threshold voltages $V_{TH}$ that are farther from the mid-eye voltage $V_{MID}$. Instead, the controller 260 can increase the equalizer setting to equalizer setting 1 and determine if the numbers of hits at the threshold voltages THR6 and THR8 increase. Similarly, after determining that the numbers of hits using equalizer setting 0 at threshold voltages THR6 and THR8 are below the baseline and deciding to increase the active equalizer setting to equalizer setting 1, there is no need to reset the threshold voltage to THR7 and count the number of hits at the mid-eye threshold voltage $V_{TH,MID}$ using the equalizer setting 1. Instead, the controller 260 can maintain the selected voltage offset $V_{OFFSET}$ (in this instance, the selected threshold voltages THR6 and THR8) and increase the active equalizer setting EQ until the number of hits is equal to the baseline. The controller 260 can then keep increasing the active equalizer setting EQ and incrementally increasing the voltage offset $V_{OFFSET}$ until the voltage offset $V_{OFFSET}$ has reached its limit (e.g., a voltage offset $V_{OFFSET}$ to the threshold voltages THR0 and THR14 of FIGS. 5A and 5B), the active equalizer setting EQ is the maximum equalizer setting of the equalizer 210, or the active equalizer setting EQ over-equalizes the output signal.

Figure 6:
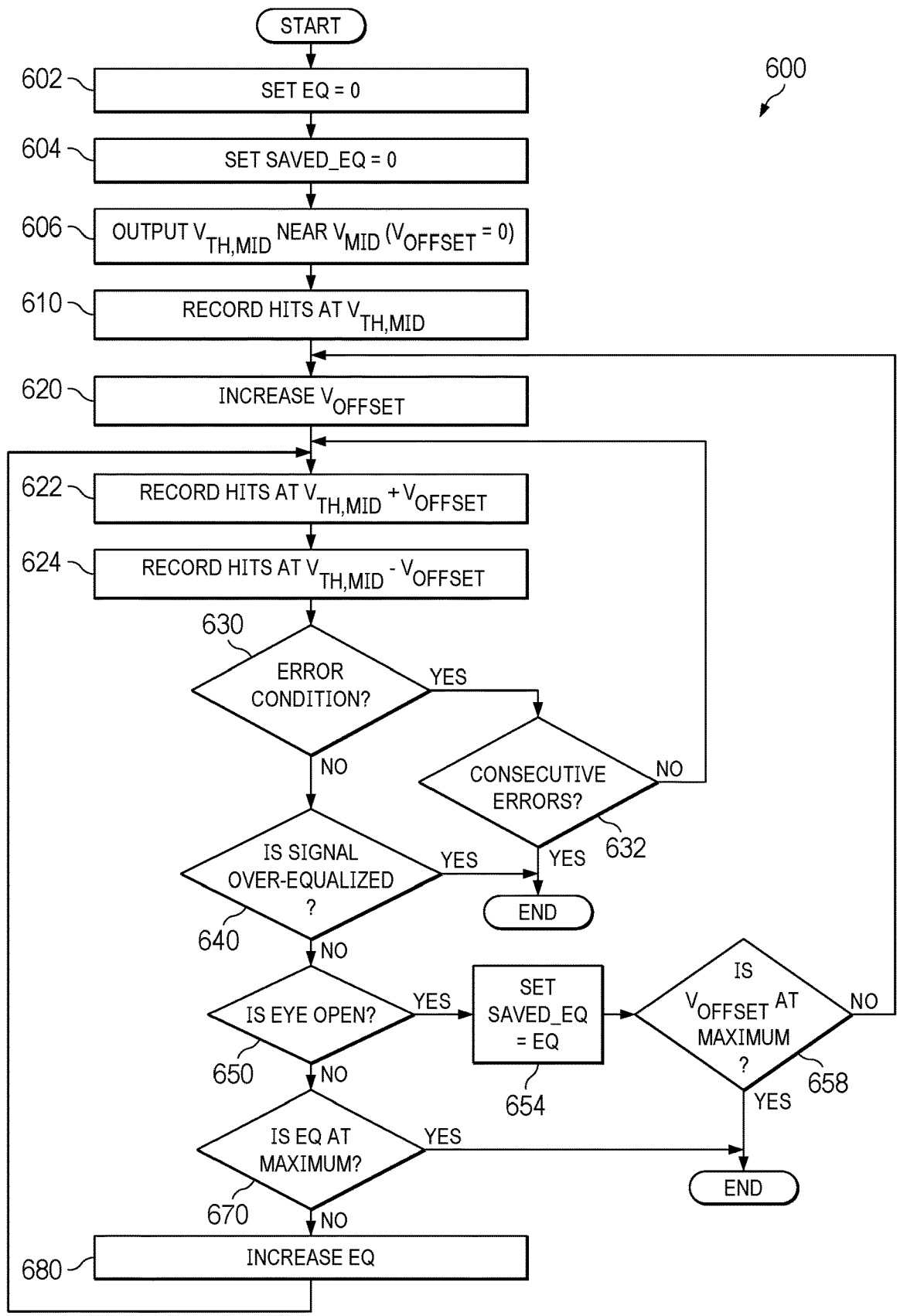
FIG. 6 is a flowchart illustrating a novel process for efficiently selecting an equalizer setting to equalize signals received via a communications link according to an illustrative embodiment.

FIG. 6 is a flowchart illustrating a novel process 600 for efficiently selecting an equalizer setting to equalize signals received via a communications link according to an illustrated embodiment. The process 600 may be performed by the system 200, for example during link training, to identify the equalizer setting of the equalizer 210 to equalize signals received via a newly established communications link. During the process 600, the equalizer 210 receives a training pattern and outputs an equalized output signal.

The active equalizer setting EQ of the equalizer 210 is set to a first equalizer setting in step 602. In an embodiment, the first equalizer setting is the minimum equalizer setting of the equalizer 210. As described above, the minimum equalizer setting is the equalizer setting, from among that plurality of equalizer settings, that causes the equalizer 210 to perform the least amount of signal equalization and introduce the least amount of signal gain. As described above, the active equalizer setting EQ of the equalizer 210 may be set by the controller 260.

An indication of the first equalizer setting is stored as a variable (e.g., "SAVED_EQ") in step 604. The variable may be stored by the controller 260 (e.g., in the memory 264), As described below, the process 600 is recursive and the variable may be updated to reflect the active equalizer setting EQ of the equalizer 210 each time step 654 is performed during the recursive process 600. When the process 600 ends, that variable reflects the equalizer setting of the equalizer 210 selected to equalize signals received via the communications link as determined using the process 600. While the variable is referred to below as SAVED_EQ, one of ordinary skill would recognize that any variable name may be used.

A mid-eye threshold voltage $V_{TH,MID}$ near the mid-eye voltage $V_{MID}$ of the equalized output signal output by the equalizer 210 (e.g., when the equalizer 210 is set to equalizer setting 0) is output in step 606. For example, the controller 260 may select, from a plurality of predetermined threshold voltages $V_{TH}$, the threshold voltage $V_{TH}$ nearest to the mid-eye voltage $V_{MID}$ of the equalized output signal output by the equalizer 210. In the example shown in FIGS. 4 and 5, for instance, the mid-eye threshold voltage $V_{TH,MID}$ is the threshold voltage THR7. The controller 260 may then output the mid-eye threshold voltage $V_{TH,MID}$ to the comparator 230. For instance, the controller 260 may output a control signal associated with the mid-eye threshold voltage $V_{TH,MID}$ to the DAC 280, causing the DAC 280 to output the mid-eye threshold voltage $V_{TH,MID}$ to the comparator 230.

A baseline number of hits at the mid-eye threshold voltage $V_{TH,MID}$ is recorded in step 610. For example, the comparator 230 may compare the equalized output signal output by the equalizer 210 to the mid-eye threshold voltage $V_{TH,MID}$ output by the controller 260 (via the DAC 280) during a predetermined time interval. The baseline number of hits may be a number indicative of the number of times that the equalized output signal crosses the mid-eye threshold voltage $V_{TH,MID}$, as determined by the comparator 230, divided by the divider 240, and counted by the counter 250.

A voltage offset $V_{OFFSET}$ is incrementally increased in step 620. For example, the controller 260 may select, from the plurality of predetermined threshold voltages $V_{TH}$, the lowest threshold voltage $V_{TH}$ that is greater than the mid-eye threshold voltage $V_{TH,MID}$ and the highest threshold voltage $V_{TH}$ that is less than the mid-eye threshold voltage $V_{TH,MID}$ (in the example embodiments of FIGS. 4 and 5, for instance, the threshold voltages THR6 and THR8). Again, those threshold voltages $V_{TH}$ may be selected by the controller 260 and output by the controller 260 to the comparator 230 (via the DAC 280).

The number of hits at the selected voltage offset $V_{OFFSET}$ greater than the mid-eye threshold voltage $V_{TH,MID}$ is recorded in step 622. The number of hits at the selected voltage offset $V_{OFFSET}$ less than the mid-eye threshold voltage $V_{TH,MID}$ is recorded in step 624. Again, the number of hits may be a number indicative of the number of times that the equalized output signal crosses each threshold voltage $V_{TH}$ at the selected voltage offset $V_{OFFSET}$ (e.g., as determined by the comparator 230, divided by the divider 240, and counted by the counter 250). The controller 260 may store the number of hits at the selected voltage offset $V_{OFFSET}$ (recorded in steps 622 and 624) relative to the baseline (determined in step 610). Recording the number of hits relative to the baseline reduces the number of gates (or, for example, the amount of memory) required to store the number of hits, which reduces the die size of (and the power required by) the system 200.

The process 600 may include determining whether an error condition exists in step 630. For example, the controller 260 may compare the number of hits at the selected voltage offset $V_{OFFSET}$ greater than the mid-eye threshold voltage $V_{TH,MID}$ (recorded in step 622) and the number of hits at the selected voltage offset $V_{OFFSET}$ less than the mid-eye threshold voltage $V_{TH,MID}$ (recorded in step 624). If no error condition exists, then the equalized output signal will be reasonably symmetrical and the number of hits at the selected voltage offset $V_{OFFSET}$ greater than the mid-eye threshold voltage $V_{TH,MID}$ will be equal to (or with the predetermined margin of) the number of hits at the selected voltage offset $V_{OFFSET}$ less than the mid-eye threshold voltage $V_{TH,MID}$. Accordingly, the controller 260 may compare both numbers of hits at the selected voltage offset $V_{OFFSET}$ to the baseline and determine that an error condition exists if one is greater than the baseline (e.g., by an amount equal to or greater than the predetermined margin) while the other is less than the baseline (e.g., by an amount equal to or greater than the predetermined margin).

If an error condition is detected (step 630: Yes), a determination may be made in step 632 as to whether consecutive error conditions have been detected. The first time an error condition is detected (step 632: No), the controller 260 may store an error condition status indicating that an error condition was detected and the process 600 may return to steps 622 and 624 so that the number of hits at the selected voltage offset $V_{OFFSET}$ may be re-recorded. The controller 260 may clear that error condition status each time no error condition exists (step 630: No). However, if a consecutive error condition is detected in step 630 before the error condition status is cleared (step 632: Yes), the process 600 may end. As described below with respect to some example embodiments, when the process 600 ends, the controller 260 may select the equalizer setting indicated by the stored variable SAVED_EQ. If no error condition exists (step 630: No), the process 600 proceeds to step 640.

A determination is made as to whether the equalized output signal is over-equalized in step 640. For example, the controller 260 may determine if the equalized output signal is over-equalized by comparing the numbers of hits at the selected voltage offset $V_{OFFSET}$ greater than the mid-eye threshold voltage $V_{TH,MID}$ (recorded in step 622) and less than the mid-eye threshold voltage $V_{TH,MID}$ (recorded in step 624) to the baseline number of hits at the mid-eye threshold voltage $V_{TH,MID}$ (recorded in step 610). If either number of hits at the selected voltage offset $V_{OFFSET}$ (either greater than or less than the mid-eye threshold voltage $V_{TH,MID}$) is greater than the baseline (or is greater than the baseline by an amount equal to or greater than the predetermined margin), then the controller 260 may determine that the equalized output signal is over-equalized (step 640: Yes). If the equalized output signal of the equalizer 210 is over-equalized (step 640: Yes), the process 600 ends. In those instances, the controller 260 may, in some example embodiments, select the equalizer setting indicated by the stored variable SAVED_EQ as the equalizer setting of the equalizer 210 to equalize signals received via the communications link.

If the equalized output signal is not over-equalized (step 640: No), a determination is made as to whether the eye of the equalized output signal is open in step 650. For example, the controller 260 may compare the numbers of hits at the selected voltage offset $V_{OFFSET}$ greater than and less than the mid-eye threshold voltage $V_{TH,MID}$ (recorded in steps 622 and 624) to the baseline number of hits (recorded in step 610). The controller 260 may determine that the eye of the equalized output signal is open (step 650: Yes) if both numbers of hits at the selected voltage offset $V_{OFFSET}$ (greater than and less than the mid-eye threshold voltage $V_{TH,MID}$) are both equal to (or within the predetermined margin of) the baseline number of hits.

Each time a determination is made that the eye of the equalized output signal is open (step 650: Yes), the variable SAVED_EQ may be updated in step 654 to reflect the active equalizer setting EQ of the equalizer 210. For example, the controller 260 may update the variable SAVED_EQ (stored, for example, in the memory 264) to be equal to the active equalizer setting EQ of the equalizer 210 set by the controller 260. Because the process 600 is recursive, the active equalizer setting EQ of the equalizer 210 may be set to the first equalizer setting (e.g., the minimum equalizer setting) in step 602 and then, as described below, may be (in some instances, repeatedly) increased in step 680.

If the eye of the equalized output signal is open (step 650: Yes), a determination is made as to whether the selected voltage offset $V_{OFFSET}$ is at the maximum setting in step 658. As described above, for example, the controller 260 may be configured to output each of a plurality of predetermined threshold voltages $V_{TH}$ (e.g., the threshold voltages THR0 through THR14) to the comparator 230 (via the DAC 280). In those instances, the controller 260 may determine that the selected voltage offset $V_{OFFSET}$ is at the maximum setting if the selected voltage offset $V_{OFFSET}$ is such that the controller 260 has output the lowest predetermined threshold voltage $V_{TH}$ (e.g., the threshold voltages THR0) and the highest predetermined threshold voltage $V_{TH}$ (e.g., the threshold voltage THR14).

If the eye of the equalized output signal is open (step 650: Yes) and the selected voltage offset $V_{OFFSET}$ is at the maximum setting (step 658: Yes), then the process 600 ends. In those instances, the controller 260 may select the equalizer setting indicated by the stored variable SAVED_EQ as the equalizer setting of the equalizer 210 to equalize signals received via the communications link.

If the eye of the equalized output signal is open (step 650: Yes) and the selected voltage offset $V_{OFFSET}$ is not the maximum setting (Step 658: No), then the process 600 returns to step 620 and the voltage offset $V_{OFFSET}$ is again increased. Again, as described above, the controller 260 may be configured to output each of a plurality of predetermined threshold voltages $V_{TH}$ (e.g., the threshold voltages THR0 through THR14) to the comparator 230 (via the DAC 280). In those instances, the controller 260 may increase the voltage offset $V_{OFFSET}$ by selecting the predetermined threshold voltage $V_{TH}$ that is incrementally greater than the larger of the two previously selected predetermined threshold voltages $V_{TH}$ and selecting the predetermined threshold voltage $V_{TH}$ that is incrementally less than the smaller of the two previously selected predetermined threshold voltages $V_{TH}$.

Returning to step 650, a determination may be made that the eye of the equalized output signal is not open (step 650: No). For example, the controller 260 may compare the numbers of hits at the selected voltage offset $V_{OFFSET}$ greater than and less than the mid-eye threshold voltage $V_{TH,MID}$ (recorded in steps 622 and 624) to the baseline number of hits (recorded in step 610) and may determine that the eye of the equalized output signal not open (step 650: No) if either number of hits at the selected voltage offset $V_{OFFSET}$ (either greater than or less than the mid-eye threshold voltage $V_{TH,MID}$) is less than the baseline number of hits (or less than the baseline number of hits by an amount that is equal to or greater than the predetermined margin).

If the eye of the equalized output signal is not open (step 650: No), a determination may be made in step 670 as to whether the active equalizer setting EQ of the equalizer 210 is the maximum equalizer setting of the equalizer 210. As described above, for example, the equalizer 210 may have a plurality of equalizer settings and the maximum equalizer setting may be the equalizer setting, from among that plurality of equalizer settings, that causes the equalizer 210 to perform the highest amount of signal equalization and introduce the highest amount of signal gain.

If the eye of the equalized output signal is not open (step 650: No) but the active equalizer setting EQ is the maximum equalizer setting of the equalizer 210 (step 670: Yes), then the process 600 ends. In those instances, the controller 260 may select the equalizer setting indicated by the stored variable SAVED_EQ as the equalizer setting of the equalizer 210 to equalize signals received via the communications link.

If the eye of the equalized output signal is not open (step 650: No) and the active equalizer setting EQ is not the maximum equalizer setting of the equalizer 210 (step 670: No), then the active equalizer setting EQ of the equalizer 210 is increased in step 680. For example, the controller 260 may identify the lowest equalizer setting, from among the plurality of equalizer settings of the equalizer 210, that is greater than the active equalizer setting EQ and set the active equalizer setting of the equalizer 210 to the identified equalizer setting. Unlike when generating a full cumulative distribution function as shown in FIGS. 5A and 5B, which requires that hits be recorded at each voltage offset $V_{OFFSET}$ using each equalizer setting EQ, once a determination is made during the process 600 that the eye of the equalized output signal is not open (step 650: No), the process 600 does not require that the voltage offset $V_{OFFSET}$ be repeatedly increased (step 620) so that hits can be recorded (steps 622 and 624) at each voltage offset $V_{OFFSET}$ using that active equalizer setting EQ. Instead, because it can be assumed that the number of hits at higher voltage offsets $V_{OFFSET}$ will not be higher than the number of hits at the selected voltage offset $V_{OFFSET}$, let alone equal to the baseline, the active equalizer setting EQ of the equalizer 210 is increased in step 680 without recording hits at each voltage offset $V_{OFFSET}$ using that equalizer setting.

After the active equalizer setting EQ is increased in step 680, the process 600 returns to step 622 where, using the newly increased active equalizer setting EQ of the equalizer 210, the number of hits are recorded at the selected voltage offset $V_{OFFSET}$ greater than the mid-eye threshold voltage $V_{TH,MID}$ (step 622) and less than the mid-eye threshold voltage $V_{TH,MID}$ (step 624). Again unlike when generating a full cumulative distribution function as shown in FIGS. 5A and 5B, which requires that hits be recorded for each equalizer setting at each voltage offset $V_{OFFSET}$, if the voltage offset $V_{OFFSET}$ has been increased (step 620) and the active equalizer setting EQ has been increased (step 680) during the process 600, the process 600 does not require that the number of hits be recorded at lower voltage offsets $V_{OFFSET}$. Instead, after the equalizer setting is increased in step 680, the process 600 starts back at step 622 with the same voltage offset $V_{OFFSET}$ that was previously selected for a previous equalizer setting (because the eye height at a higher equalizer setting is expected to match or exceed the eye height at all lower equalizer settings).

The process 600 is recursive. If the eye of the equalized output signal is open (step 650: Yes), the variable SAVED_EQ is updated (step 654) and the voltage offset $V_{OFFSET}$ is increased (step 620) until the eye of the equalized output signal is no longer open (step 650: No) or until the maximum voltage offset $V_{OFFSET}$ has been selected (Step 658: Yes). If the eye of the equalized output signal is not open (step 650: No), the active equalizer setting EQ of the equalizer 210 is increased (step 680) until the eye of the equalized output signal is open (step 650: Yes), until the active equalizer setting EQ is the maximum equalizer setting of the equalizer 210 (step 670: Yes), or until the output signal is over-equalized (step: 640: Yes).

As described above, for each communications link, the system 200 can identify the equalizer setting to equalize signals received via the communications link by dynamically changing the active equalizer setting EQ of the equalizer 210 and using a comparator 230 to compare the equalized signal output by the equalizer 210 at a series of voltage offsets $V_{OFFSET}$.

FIG. 7 is a graph illustrating how the system 200 performing the process 600 may select the equalizer setting to equalize signals received via the example USB channel of FIG. 5A while collecting fewer data points (in this example, 35 data points) than the full cumulative distribution function shown in FIG. 5A.

As shown in FIG. 7, the baseline for determining whether the eye of the equalized output signal may be established by recording the number of hits at the mid-eye threshold voltage $V_{TH,MID}$ (in this example, the threshold voltage THR7) using a first equalizer setting (e.g., the minimum equalizer setting, equalizer setting 0). The voltage offset $V_{OFFSET}$ may then be increased to the threshold voltages THR6 and THR8. Because the number of hits at the selected voltage offset $V_{OFFSET}$ is less than the baseline by more than the predetermined margin, the active equalizer setting EQ is increased, without determining the number of hits using equalizer setting 0 at higher voltage offsets $V_{OFFSET}$, until an active equalizer setting EQ is identified (in this example, equalizer setting 2) where the number of hits at the increased voltage offset $V_{OFFSET}$ (to the threshold voltages THR6 and THR8) is within the predetermined margin of the baseline.

Because the eye of the equalized output signal is open at the selected voltage offset $V_{OFFSET}$ (to the threshold voltages THR6 and THR8), the active equalizer setting (EQ=2) is stored as the variable SAVED_EQ and the voltage offset $V_{OFFSET}$ is increased to the threshold voltages THR5 and THR9. Because the number of hits are less than the baseline by more than the predetermined margin, the active equalizer setting EQ is increased to equalizer setting 3 and then equalizer setting 4, at which point the active equalizer setting (EQ=4) is stored as the variable SAVED_EQ and the voltage offset $V_{OFFSET}$ is increased to the threshold voltages THR4 and THR10, where the eye of the equalized output signal is closed until the active equalizer setting EQ is increased to equalizer setting 6, at which point the active equalizer setting (EQ=6) is stored as the variable SAVED_EQ and the voltage offset $V_{OFFSET}$ is increased to the threshold voltages THR3 and THR11. Again, the number of hits at the increased voltage offset $V_{OFFSET}$ (to the threshold voltages THR3 and THR11) remains less than the baseline by more than the predetermined margin until the active equalizer setting EQ is increased to equalizer setting 7, at which point the active equalizer setting (EQ=7) is stored as the variable SAVED_EQ and the voltage offset $V_{OFFSET}$ is increased to the threshold voltages THR2 and THR12, at which point the eye of the equalized output signal is closed until the active equalizer setting EQ is increased to equalizer setting 9.

Using equalizer setting 9, the eye of the equalized output signal is open at the selected voltage offset $V_{OFFSET}$ (to the threshold voltages THR2 and THR12). Therefore, the active equalizer setting (EQ=9) is stored as the variable SAVED_EQ and the voltage offset $V_{OFFSET}$ is increased to the threshold voltages THR1 and THR13. Using equalizer setting 9, the number of hits at the increased voltage offset $V_{OFFSET}$ (to the threshold voltages THR2 and THR12) is less than the baseline by more than the predetermined margin. Therefore, the active equalizer setting EQ is then increased to equalizer setting 10. However, using equalizer setting 10, the number of hits at the selected voltage offset $V_{OFFSET}$ (to the threshold voltages THR2 and THR12) remains less than the baseline by more than the predetermined margin. Therefore, the active equalizer setting EQ is again increased to equalizer setting 11. Using equalizer setting 11, however, the equalizer 210 over-equalizes the output signal and the number of hits at the selected voltage offset $V_{OFFSET}$ (to the threshold voltages THR2 and THR12) are greater than the baseline by more than the predetermined margin. Because the output signal of the equalizer 210 is over-equalized, the process 600 ends.

The equalizer setting stored as the variable SAVED_EQ at the end of the process 600 (in this example, equalizer setting 9) is selected as the equalizer setting to equalize signals received via the communications link. As described above, the selected equalizer setting is the lowest equalizer setting of the equalizer 210 that causes the equalized output signal to remain open at the highest voltage offset $V_{OFFSET}$. For the example USB channel of FIG. 5A, the selected equalizer setting is equalizer setting 9. As shown in FIG. 7 and described above, the system 200 performing the process 600 can select that equalizer setting more efficiently than prior art methods, which compare the output signal of the equalizer at every equalizer setting to every threshold voltage to generate a full cumulative distribution function as shown in FIG. 5A.

The process 600 can be performed, for example, during the USB 3.2 Polling. RxEQ phase of link training. The process 600 enables the controller 260 to quickly converge on the equalizer setting to equalize signals received via the communication link, which is an important consideration for USB link training. While a full cumulative distribution function can take about 720 microseconds (μs) with the example equalizer range of 0 to 15, offset range of 1 to 7 and hit count duration of 3 μs, the system 200 performing the process 600 may select the equalizer setting in approximately 186 μs. The process 600 may also be used to select the equalizer setting to equalized signals received via other communications links (e.g., HDMI, PCIe, etc.), In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. A system comprising:
an equalizer having an input and an output;
a comparator coupled to the equalizer;
a counter coupled to the comparator and configured to output a number of hits indicative of the number of times that an instantaneous voltage at the equalizer output crosses a threshold voltage during a predetermined time interval; and
a controller coupled to the counter and the equalizer and configured to:
set an active equalizer setting to a first equalizer setting;
select, from a plurality of predetermined threshold voltages, the threshold voltage nearest to a mid-eye voltage of the equalizer output;
store the number of hits at the threshold voltage nearest to the mid-eye voltage as a baseline;
increase a voltage offset by selecting a threshold voltage from the plurality of predetermined threshold voltages that is incrementally greater than or incrementally less than the mid-eye voltage of the equalizer output;
further increase the voltage offset in response to a determination that the number of hits at the selected threshold voltage is within a predetermined margin of the baseline; and
increase the active equalizer setting in response to a determination that the number of hits at the selected threshold voltage is less than the baseline by an amount that is equal to or greater than the predetermined margin.

2. The system of claim 1, wherein the controller is further configured to repeatedly increase the voltage offset in response to each determination that the number of hits at the selected threshold voltage is within the predetermined margin of the baseline.

3. The system of claim 2, wherein the controller is further configured to repeatedly increase the active equalizer setting in response to each determination that the number of hits at the selected threshold voltage is less than the baseline by an amount that is equal to or greater than the predetermined margin.

4. The system of claim 3, wherein the controller is configured to determine whether the instantaneous voltage at the equalizer output is over-equalized by determining whether the number of hits at the selected threshold voltage is greater than the baseline by an amount that is equal to or greater than the predetermined margin.

5. The system of claim 4, wherein the controller is further configured to:
store an indication of the active equalizer setting and increase the voltage offset in response to each determination that the number of hits at the selected threshold voltage is within the predetermined margin of the baseline; and
select the stored equalizer setting in response to a determination that the selected threshold voltage is the highest or lowest threshold voltage of the plurality of predetermined threshold voltages, the active equalizer setting is the maximum equalizer setting of the equalizer and the number of hits at the selected threshold voltage is less than the baseline by an amount that is equal to or greater than the predetermined margin, or the instantaneous voltage at the equalizer output is over-equalized.

6. The system of claim 5, wherein the selected equalizer setting is the lowest equalizer setting of the equalizer where the number of hits is within the predetermined margin of the baseline at the highest voltage offset.

7. The system of claim 1, wherein the controller is configured to:
increase the voltage offset by selecting the two threshold voltages from the plurality of predetermined threshold voltages that are incrementally greater than and incrementally less than the mid-eye voltage;
repeatedly increase the voltage offset, by selecting the two threshold voltages from the plurality of predetermined threshold voltages that are incrementally greater than and incrementally less than the selecting threshold voltages, in response to a determination that both numbers of hits at the selected threshold voltages are both within the predetermined margin of the baseline; and
repeatedly increase the active equalizer setting in response to a determination that either number of hits at either of the selected threshold voltages is less than the baseline by an amount that is equal to or greater than the predetermined margin.

8. The system of claim 7, wherein the controller is configured to determine whether the equalizer output is over-equalized by determining whether either number of hits at either of the selected threshold voltages is greater than the baseline by an amount that is equal to or greater than the predetermined margin.

9. The system of claim 8, wherein the controller is further configured to:
store an indication of the active equalizer setting and increase the voltage offset in response to each determination that both numbers of hits at the selected threshold voltages are both within the predetermined margin of the baseline;
select the stored equalizer setting in response to a determination that the selected threshold voltages are the highest or lowest threshold voltages of the plurality of predetermined threshold voltages, the active equalizer setting is the maximum equalizer setting and either number of hits at either of the selected threshold voltages is less than the baseline by an amount that is equal to or greater than the predetermined margin, or the equalizer output is over-equalized.

10. The system of claim 1, wherein the controller is configured to select the threshold voltage by outputting a digital control signal to a digital-to-analog converter that outputs an analog voltage to the comparator.

11. A system comprising:
an equalizer; and
controller for selecting an equalizer setting to equalize signals received via a communications link, wherein the controller is configured to:
set an active equalizer setting to a first equalizer setting;
select, from a plurality of predetermined threshold voltages, a threshold voltage nearest to a mid-eye voltage of an equalizer output of the equalizer;
store the number of hits at the threshold voltage nearest to the mid-eye voltage as a baseline, wherein the number of hits is indicative of the number of times that an instantaneous voltage at the equalizer output crosses the threshold voltage during a predetermined time interval;
increase a voltage offset by selecting a threshold voltage from the plurality of predetermined threshold voltages that is incrementally greater than or incrementally less than the mid-eye voltage of the equalizer output;
further increase the voltage offset in response to a determination that the number of hits at the selected threshold voltage is within a predetermined margin of the baseline; and
increase the active equalizer setting in response to a determination that the number of hits at the selected threshold voltage is less than the baseline by an amount that is equal to or greater than the predetermined margin.

12. The system of claim 11, wherein the controller is further configured to repeatedly increase the voltage offset in response to each determination that the number of hits at the selected threshold voltage is within the predetermined margin of the baseline.

13. The system of claim 12, wherein the controller is further configured to repeatedly increase the active equalizer setting in response to each determination that the number of hits at the selected threshold voltage is less than the baseline by an amount that is equal to or greater than the predetermined margin.

14. The system of claim 13, wherein the controller is configured to determine whether the instantaneous voltage at the equalizer output is over-equalized by determining whether the number of hits at the selected threshold voltage is greater than the baseline by an amount that is equal to or greater than the predetermined margin.

15. The system of claim 14, wherein the controller is further configured to:
store an indication of the active equalizer setting and increase the voltage offset in response to each determination that the number of hits at the selected threshold voltage is within the predetermined margin of the baseline; and
select the stored equalizer setting in response to a determination that the selected threshold voltage is the highest or lowest threshold voltage of the plurality of predetermined threshold voltages, the active equalizer setting is the maximum equalizer setting of the equalizer and the number of hits at the selected threshold voltage is less than the baseline by an amount that is equal to or greater than the predetermined margin, or the instantaneous voltage at the equalizer output is over-equalized.

16. The system of claim 15, wherein the selected equalizer setting is the lowest equalizer setting of the equalizer where the number of hits is within the predetermined margin of the baseline at the highest voltage offset.

17. The system of claim 16, wherein the controller is configured to:
increase the voltage offset by selecting the two threshold voltages from the plurality of predetermined threshold voltages that are incrementally greater than and incrementally less than the mid-eye voltage;
repeatedly increase the voltage offset, by selecting the two threshold voltages from the plurality of predetermined threshold voltages that are incrementally greater than and incrementally less than the selecting threshold voltages, in response to a determination that both numbers of hits at the selected threshold voltages are both within the predetermined margin of the baseline; and repeatedly increase the active equalizer setting in response to a determination that either number of hits at either of the selected threshold voltages is less than the baseline by an amount that is equal to or greater than the predetermined margin.

18. The system of claim 17, wherein the controller is configured to determine whether the equalizer output is over-equalized by determining whether either number of hits at either of the selected threshold voltages is greater than the baseline by an amount that is equal to or greater than the predetermined margin.

19. The system of claim 18, wherein the controller is further configured to:

store an indication of the active equalizer setting and increase the voltage offset in response to each determination that both numbers of hits at the selected threshold voltages are both within the predetermined margin of the baseline; and select the stored equalizer setting in response to a determination that the selected threshold voltages are the highest or lowest threshold voltages of the plurality of predetermined threshold voltages, the active equalizer setting is the maximum equalizer setting and either number of hits at either of the selected threshold voltages is less than the baseline by an amount that is equal to or greater than the predetermined margin, or the equalizer output is over-equalized.

20. The system of claim 11, wherein the controller is configured to select the threshold voltage by outputting a digital control signal to a digital-to-analog converter that outputs an analog voltage to a comparator.

* * * * *